(12) United States Patent
Kwon

(10) Patent No.: US 11,198,429 B2
(45) Date of Patent: Dec. 14, 2021

(54) PARKING CONTROL APPARATUS AND METHOD

(71) Applicant: MANDO CORPORATION, Gyeonggi-do (KR)

(72) Inventor: Young Ju Kwon, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 175 days.

(21) Appl. No.: 15/983,020

(22) Filed: May 17, 2018

(65) Prior Publication Data
US 2018/0339701 A1 Nov. 29, 2018

(30) Foreign Application Priority Data
May 26, 2017 (KR) .......... 10-2017-0065455

(51) Int. Cl.
*B60W 30/06* (2006.01)
*B60W 10/10* (2012.01)
(Continued)

(52) U.S. Cl.
CPC ............ *B60W 30/06* (2013.01); *B60W 10/04* (2013.01); *B60W 10/10* (2013.01); *B60W 10/20* (2013.01);
(Continued)

(58) Field of Classification Search
CPC ...... B60W 30/06; B60W 10/10; B60W 10/20; B60W 40/02; B60W 10/04; B60W 2400/00; B60W 2420/52; B60W 2420/42; B60W 2710/10; B60W 2710/20; B60W 2550/10; B60W 2420/54; B60W 2050/0043; B62D 15/027; B62D 15/0285; G05D 1/0246; G05D 1/0257; G05D 1/0223; G05D 2201/0213
See application file for complete search history.

(56) References Cited

U.S. PATENT DOCUMENTS 4,323,988 A * 4/1982 Will ..................... G01S 15/00
                                                            367/153
4,657,102 A * 4/1987 Kanazawa ............ B62D 7/1572
                                                            180/415
(Continued)

FOREIGN PATENT DOCUMENTS

CN     101196737 A * 6/2008 ...... B60W 30/18063
CN     101269628 A * 9/2008
(Continued)

OTHER PUBLICATIONS

Office Action dated Oct. 12, 2018 for Korean Patent Application No. 10-2017-0065455 and its English machine translation by Google Translate.
(Continued)

*Primary Examiner* — Behrang Badii
*Assistant Examiner* — Jalal C Coduroglu
(74) *Attorney, Agent, or Firm* — Ladas & Parry, LLP

(57) ABSTRACT

The present disclosure relates to an apparatus and method for controlling a parking operation of a vehicle, and more specifically, to a specific method and apparatus for controlling a parking operation of a vehicle using a radar sensor and an ultrasonic sensor of the vehicle to reduce parking time.

18 Claims, 10 Drawing Sheets

(51) Int. Cl.
  *B60W 10/20* (2006.01)
  *B60W 40/02* (2006.01)
  *G05D 1/02* (2020.01)
  *B60W 10/04* (2006.01)
  *B62D 15/02* (2006.01)

(52) U.S. Cl.
  CPC ........... *B60W 40/02* (2013.01); *B62D 15/027* (2013.01); *B62D 15/0285* (2013.01); *G05D 1/0223* (2013.01); *G05D 1/0246* (2013.01); *G05D 1/0257* (2013.01); *B60W 2400/00* (2013.01); *B60W 2420/42* (2013.01); *B60W 2420/52* (2013.01); *B60W 2420/54* (2013.01); *B60W 2554/00* (2020.02); *B60W 2710/10* (2013.01); *B60W 2710/20* (2013.01); *G05D 2201/0213* (2013.01)

(56) References Cited

U.S. PATENT DOCUMENTS

| | | | | |
|---|---|---|---|---|
| 5,278,554 A * | 1/1994 | Marton | ............... | G08G 1/081 340/909 |
| 5,570,287 A * | 10/1996 | Campbell | ............ | B60G 17/016 280/5.51 |
| 6,968,265 B2 * | 11/2005 | Wakitani | ............... | B60L 3/08 701/50 |
| 8,265,834 B2 * | 9/2012 | Inoue | ............... | B62D 15/027 701/49 |
| 8,493,436 B2 * | 7/2013 | Lyon | ............... | H04N 5/23238 348/47 |
| 8,624,990 B2 * | 1/2014 | Ohtsubo | ............... | H04N 5/232 348/222.1 |
| 8,686,875 B2 * | 4/2014 | Inoue | ............... | G01S 15/931 340/932.2 |
| 8,849,310 B2 * | 9/2014 | Fan | ............... | H04W 4/02 455/456.3 |
| 8,914,185 B2 * | 12/2014 | Ueno | ............... | F16H 61/12 701/29.2 |
| 9,080,878 B2 * | 7/2015 | Skinder | ............... | G08G 1/144 |
| 9,145,138 B2 * | 9/2015 | Kim | ............... | B60W 30/06 |
| 9,291,491 B2 * | 3/2016 | Tran | ............... | G01S 15/10 |
| 9,481,368 B2 * | 11/2016 | Tomozawa | ............... | B62D 15/0285 |
| 9,514,645 B2 * | 12/2016 | Hallek | ............... | G08G 1/166 |
| 9,594,956 B2 * | 3/2017 | Cohen | ............... | G07B 15/02 |
| 9,595,072 B2 * | 3/2017 | Fan | ............... | H04W 64/003 |
| 9,646,428 B1 * | 5/2017 | Konrardy | ............... | G08G 1/005 |
| 9,836,658 B2 * | 12/2017 | Kiyokawa | ............... | B62D 15/0285 |
| 9,875,655 B2 * | 1/2018 | Kiyokawa | ............... | B62D 15/028 |
| 9,944,317 B2 * | 4/2018 | Lee | ............... | G01S 15/931 340/435 |
| 10,366,611 B2 * | 7/2019 | Hayakawa | ............... | G08G 1/144 |
| 10,377,309 B2 * | 8/2019 | Lee | ............... | G06K 9/00798 |
| 2004/0217869 A1 * | 11/2004 | Bouchard | ............... | G01S 13/825 340/573.4 |
| 2005/0085984 A1 * | 4/2005 | Uhler | ............... | B60T 7/22 701/70 |
| 2005/0264099 A1 * | 12/2005 | Kamiya | ............... | B60T 7/22 303/15 |
| 2006/0287826 A1 * | 12/2006 | Shimizu | ............... | B60Q 1/0023 701/431 |
| 2007/0027598 A1 * | 2/2007 | Mori | ............... | B60W 10/184 701/41 |
| 2007/0088490 A1 * | 4/2007 | Sutardja | ............... | G08G 1/127 701/117 |
| 2008/0051985 A1 * | 2/2008 | D'Andrea | ............... | G05D 1/0212 701/410 |
| 2009/0009306 A1 * | 1/2009 | Magane | ............... | G01S 15/931 340/435 |
| 2009/0040068 A1 * | 2/2009 | Oyobe | ............... | B60L 15/007 340/932.2 |
| 2009/0062982 A1 * | 3/2009 | Obata | ............... | B62D 1/046 701/36 |
| 2009/0251334 A1 * | 10/2009 | Yoshihashi | ............... | B60W 50/14 340/932.2 |
| 2010/0155165 A1 * | 6/2010 | Tseng | ............... | B60S 9/215 180/200 |
| 2010/0246327 A1 * | 9/2010 | Yoshida | ............... | G01S 7/52003 367/103 |
| 2011/0102197 A1 * | 5/2011 | Herwich | ............... | E01F 9/559 340/932.2 |
| 2011/0231085 A1 * | 9/2011 | Kim | ............... | B60L 50/66 701/124 |
| 2012/0262284 A1 * | 10/2012 | Irrgang | ............... | G08G 1/168 340/435 |
| 2013/0194126 A1 * | 8/2013 | Paoletti | ............... | G01S 13/931 342/55 |
| 2013/0265175 A1 * | 10/2013 | Kang | ............... | B62D 15/029 340/932.2 |
| 2014/0365108 A1 * | 12/2014 | You | ............... | B62D 15/0285 701/408 |
| 2015/0032319 A1 * | 1/2015 | Kim | ............... | B62D 15/027 701/23 |
| 2015/0042788 A1 * | 2/2015 | Fujiwara | ............... | H04N 5/2256 348/131 |
| 2015/0066280 A1 * | 3/2015 | Kim | ............... | B62D 15/027 701/23 |
| 2015/0197254 A1 * | 7/2015 | Wysietzki | ............... | B60W 40/10 701/41 |
| 2015/0258989 A1 * | 9/2015 | Okano | ............... | B62D 15/028 701/1 |
| 2015/0284000 A1 * | 10/2015 | Hayakawa | ............... | B60W 40/06 701/70 |
| 2015/0291030 A1 * | 10/2015 | Oiki | ............... | B60K 28/00 701/70 |
| 2015/0291031 A1 * | 10/2015 | Morimoto | ............... | G06K 9/00812 701/70 |
| 2015/0321555 A1 * | 11/2015 | Fukata | ............... | B60K 28/10 701/70 |
| 2015/0367845 A1 * | 12/2015 | Sannodo | ............... | B60W 30/08 701/23 |
| 2015/0375740 A1 * | 12/2015 | Okamura | ............... | B60W 30/146 701/25 |
| 2016/0075331 A1 * | 3/2016 | Tomozawa | ............... | B60W 10/18 701/41 |
| 2016/0075376 A1 * | 3/2016 | Tomozawa | ............... | B62D 15/0285 701/42 |
| 2016/0078764 A1 * | 3/2016 | Kiyokawa | ............... | B62D 15/0285 701/301 |
| 2016/0078766 A1 * | 3/2016 | Kiyokawa | ............... | G08G 1/143 340/932.2 |
| 2016/0272244 A1 * | 9/2016 | Imai | ............... | G08G 1/166 |
| 2016/0282141 A1 * | 9/2016 | Rajamani | ............... | G01D 5/14 |
| 2016/0362050 A1 * | 12/2016 | Lee | ............... | G06K 9/00805 |
| 2016/0368489 A1 * | 12/2016 | Aich | ............... | B60T 7/18 |
| 2017/0012492 A1 * | 1/2017 | Bandera | ............... | H02K 41/031 |
| 2017/0039439 A1 * | 2/2017 | Kim | ............... | G06K 9/00812 |
| 2017/0043808 A1 * | 2/2017 | Yang | ............... | G08G 1/143 |
| 2017/0129486 A1 * | 5/2017 | Nakada | ............... | B60W 10/20 |
| 2018/0086338 A1 * | 3/2018 | Yamada | ............... | B60W 50/14 |
| 2018/0339701 A1 * | 11/2018 | Kwon | ............... | B60W 30/06 |
| 2019/0054927 A1 * | 2/2019 | Hayakawa | ............... | G08G 1/14 |
| 2019/0359133 A1 * | 11/2019 | Lee | ............... | G06K 9/00805 |
| 2020/0062242 A1 * | 2/2020 | Hayakawa | ............... | B62D 15/0285 |

FOREIGN PATENT DOCUMENTS

| | | | | |
|---|---|---|---|---|
| CN | 101419462 A | * | 4/2009 | |
| CN | 102421647 A | * | 4/2012 | ............ B60T 17/004 |
| CN | 203651600 U | * | 6/2014 | |
| CN | 104787040 A | * | 7/2015 | ............ B60W 40/10 |
| CN | 105398431 A | * | 3/2016 | ............ B60W 50/10 |
| CN | 105511469 A | * | 4/2016 | ............ B60W 50/10 |
| CN | 106043282 | | 10/2016 | |
| CN | 106167045 A | * | 11/2016 | ............... G06T 7/20 |
| CN | 106256656 A | * | 12/2016 | ......... B62D 15/0285 |
| CN | 106494170 A | * | 3/2017 | ............ B60W 10/18 |
| CN | 106494395 | | 3/2017 | |
| CN | 206097506 U | * | 4/2017 | ........... B62D 15/027 |
| DE | 10330255 A1 | * | 1/2005 | ......... B60K 31/0008 |

(56) References Cited

FOREIGN PATENT DOCUMENTS

| | | | | |
|---|---|---|---|---|
| DE | 102005028956 A1 * | 1/2007 | ......... | G06K 9/00812 |
| DE | 102007027358 A1 * | 12/2007 | ............ | B60W 10/06 |
| DE | 10 2012 015 517 | 2/2014 | | |
| DE | 102012015922 A1 * | 2/2014 | ........... | B62D 15/027 |
| JP | H0620847 B2 * | 3/1994 | | |
| JP | 3612733 B2 * | 1/2005 | | |
| JP | 2008033438 A * | 2/2008 | ........... | B62D 15/027 |
| JP | 2008-137442 | 6/2008 | | |
| JP | 2010-18180 | 1/2010 | | |
| JP | 2015030363 A * | 2/2015 | ............... | G05D 1/00 |
| JP | 2015030364 A * | 2/2015 | ............ | B60T 17/004 |
| JP | 2016-60243 | 4/2016 | | |
| JP | 2016060238 A * | 4/2016 | ........... | B62D 15/028 |
| JP | 2016060243 A * | 4/2016 | ......... | G06K 9/00798 |
| KR | 20110080807 A * | 7/2011 | ......... | B60K 31/0008 |
| KR | 10-2015-0044482 | 4/2015 | | |
| KR | 20150036536 A * | 4/2015 | ........ | G01C 21/3415 |
| KR | 20160144829 A * | 12/2016 | ............... | B60R 1/00 |
| KR | 20170027635 A * | 3/2017 | ........... | B62D 15/027 |
| KR | 20170039634 A * | 4/2017 | ........... | B60W 30/06 |
| WO | WO-2011154242 A1 * | 12/2011 | ........... | B60W 30/06 |
| WO | WO-2016168650 A1 * | 10/2016 | ............. | B62D 13/06 |

OTHER PUBLICATIONS

Office Action dated Dec. 1, 2020 for Chinese Patent Application No. 201810516404.4 and its English machine translation by Google Translate.

* cited by examiner

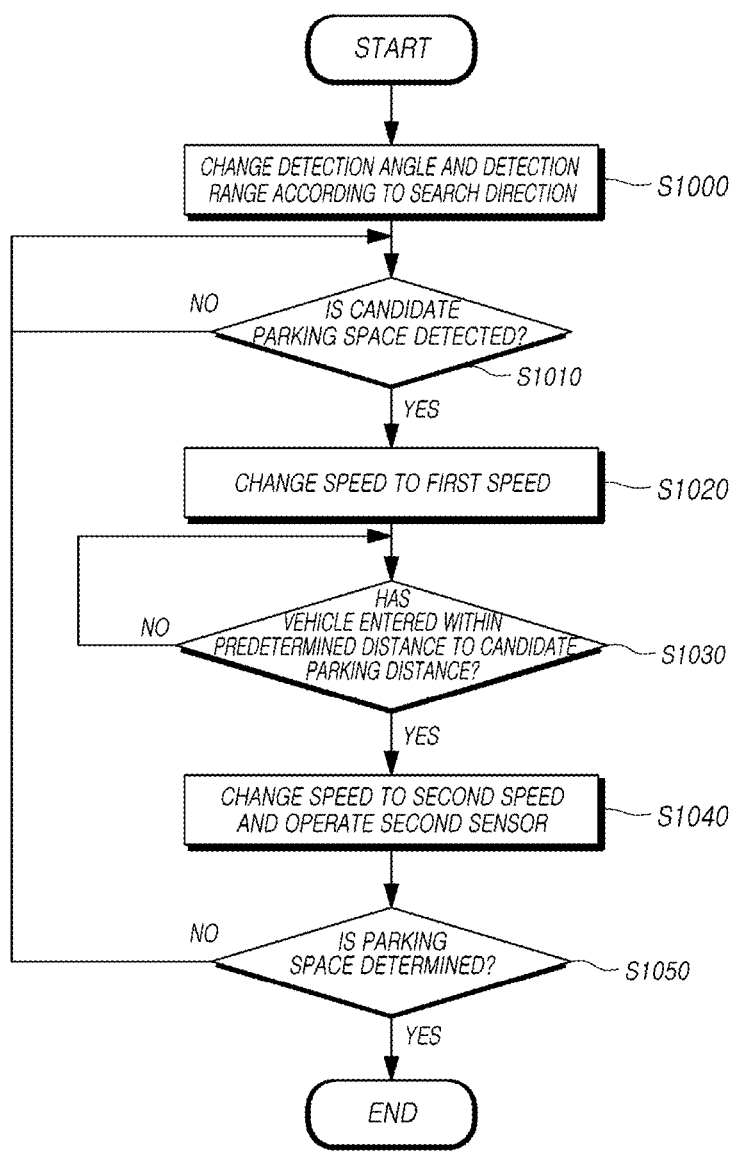

PARKING CONTROL APPARATUS AND METHOD

CROSS REFERENCE TO RELATED APPLICATION

This application claims priority from Korean Patent Application No. 10-2017-0065455, filed on May 26, 2017, which is hereby incorporated by reference for all purposes as if fully set forth herein.

BACKGROUND OF THE INVENTION

1. Field of the Invention

The present disclosure relates to an apparatus and method for controlling a parking operation of a vehicle. More specifically, the present disclosure relates to a specific method and apparatus for controlling a parking operation of a vehicle using a radar sensor and an ultrasonic sensor of the vehicle so as to reduce parking time.

2. Description of the Prior Art

Recently, parking of vehicles has been a serious issue. As the number of vehicles is increased, parking spaces are inevitably reduced due to limited areas, cities, and countries. In order to resolve the shortage of parking spaces, the size of a parking space allowing a single vehicle to be parked has been gradually decreased.

Also, if several vehicles are parked together in a parking space in which no parkingline exists, spaces between vehicles are narrow, and in this case, a driver should visually check around an obstacle and directly drive a vehicle to be parked in a narrow parking space or may have difficulty in backing the vehicle out of the narrow parking space.

Accordingly, parking control systems have recently been installed in vehicles in order to automatically park the vehicle or to assist in parking.

However, since various systems for controlling a parking operation of a vehicle control parking of vehicles for stable parking, a prolonged period of time is needed to park the vehicles in a parking space. In addition, the parking control systems generate an optimal parking path for the vehicle which involves multiple gear shifting processes, thereby failing to provide a high ability to rely on parking to the driver.

Therefore, there is a need to develop a parking control operation requiring a minimum gear shifting process and a shorter period of time.

SUMMARY OF THE INVENTION

In this background, the present disclosure is directed to a specific method and apparatus for drastically reducing the time for a parking space search in the process of parking control of a vehicle.

In addition, the present disclosure is directed to an apparatus and method which reduces the time for setting a path for parking control to reduce gear shifting process of a vehicle to the minimum, thereby saving the time required for parking control and improving ability to rely on parking control.

According to an aspect of the present disclosure, there is provided a parking control apparatus including a parking control initiator which acquires an input signal for parking control and determines whether to start a parking control operation, a sensor controller which sets a first sensor mounted in a vehicle to detect a candidate parking space when the parking control operation is started, a candidate parking space detector which detects the candidate parking space using first sensing information acquired from the first sensor, a parking space determiner which determines a parking space by computing presence or absence of an obstacle in the candidate parking space and size information of the candidate parking space using second sensing information acquired from a second sensor mounted in the vehicle, and a vehicle control signal outputter which outputs at least one of a steering control signal, a speed control signal, and a gear shifting control signal for parking the vehicle in the parking space.

According to another aspect of the present invention, there is provided a parking control method including: an parking control operation of acquiring an input signal for parking control and determining whether to start a parking control operation, a sensor control operation of setting a first sensor mounted in a vehicle for detecting a candidate parking space when the parking control operation is started, a parking space determination operation of determining a parking space by computing at least one of presence or absence of an obstacle in the candidate parking space and size information of the candidate parking space using second sensing information acquired from a second sensor mounted in the vehicle, and a parking control signal output operation of outputting at least one of a steering control signal, a speed control signal, and a gear shifting control signal.

BRIEF DESCRIPTION OF THE DRAWINGS

The above and other aspects, features and advantages of the present disclosure will be more apparent from the following detailed description taken in conjunction with the accompanying drawings, in which:

FIG. 10 is a diagram for describing an operation of a parking control method, including vehicle speed control, according to one embodiment in detail.

DETAILED DESCRIPTION OF THE EXEMPLARY EMBODIMENTS

Figure 1:
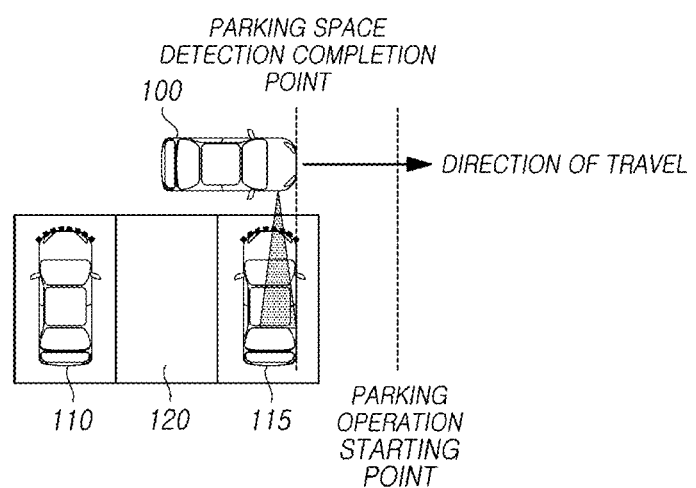
FIG. 1 is a diagram for describing an operation of a vehicle according to a conventional parking space search.

The present disclosure relates to an apparatus and method for controlling parking of a vehicle.

Hereinafter, some embodiments of the present disclosure will be described in detail with reference to the accompanying illustrative drawings. Terms such as first, second, A, B, (a), (b), and the like may be used herein when describing components of the present disclosure. The terms are merely used to distinguish one component from other components, and the property, order, sequence and the like of the corresponding component are not limited by the corresponding terms. In the case that a certain structural element is described as being "is connected to," "is coupled to," or "is in contact with" another structural element, it should be interpreted that another structural element may "be connected to," "be coupled to," or "be in contact with" the structural elements as well as that the certain structural element is directly connected to or is in direct contact with another structural element.

In the present specification, a parking control apparatus refers to a control unit that controls a parking assistance function for assisting in parking of a vehicle. For example, the parking control apparatus may refer to a main control unit (MCU) or a central processing unit (CPU), or may refer to some functions of an MCU or a CPU. The parking assistance function controlled by the parking control apparatus refers to a parking assist system (PAS) or a smart parking assist system (SPAS), and includes at least one of parking space detection, determination of possibility of parking, and a steering control and a vehicle speed control for driving the vehicle into a parking space. In addition, an input signal for determining whether to start a parking control operation may refer to information generated by various sensors, such as an ultrasonic sensor, a steering angle sensor, a camera sensor, and the like, installed inside/outside of the vehicle and may refer to a signal generated in response to a user's operation of a button or a touch pad for instructing the start of a parking control operation. Alternatively, the input signal may include information received from a navigation system, a V2X communication device inside the vehicle, or an external device of the vehicle, such as a global positioning system (GPS) module. That is, the input signal may be construed to include both the information generated autonomously by the vehicle and the information generated and transmitted from the outside of the vehicle.

In addition, in the present specification, a first sensor may refer to a sensor mounted in the vehicle to sense obstacles in front of the vehicle or at lateral sides in front of the vehicle and may be, for example, a radar sensor, a Lidar sensor, a camera sensor, or the like. In addition, a second sensor may refer to a sensor mounted in the vehicle to sense lateral sides of the vehicle and may be, for example, an ultrasonic sensor, an infrared sensor, or the like.

Hereinafter, for the sake of ease of description and understanding the first sensor will be illustratively described as a radar sensor, but may be applied as any sensor capable of sensing obstacles in front of the vehicle or at lateral sides in front of the vehicle, such as the above-described Lidar sensor and camera sensor. The second sensor will also be illustratively described as an ultrasonic sensor, but may be applied as various sensors capable of sensing the side of the vehicle and detecting a distance and an obstacle, such as the above-described infrared sensor and radar sensor.

A conventional parking assist system for automatic parking of a vehicle or assisting a driver for parking of a vehicle detects a parking space using an ultrasonic sensor configured on a side of the vehicle, sets a parking path, and controls an operation of the vehicle.

FIG. 1 is a diagram for describing an operation of a vehicle according to a conventional parking space search.

Referring to FIG. 1, a vehicle 100 receives an input signal for controlling parking and initiates a parking control operation. In this case, a lateral side ultrasonic sensor mounted in the vehicle 100 performs scanning in a traveling direction of the vehicle to determine whether a parking space 120 exists in a direction in which the vehicle 100 is to be parked. However, in order to search for the parking space 120, the vehicle 100 has to travel at a low speed enough for the ultrasonic sensor to acquire information. That is, the vehicle 100 detects other vehicles 110 and 115 through the ultrasonic sensor while traveling in the traveling direction at the low speed and, when an empty area exists, determines the empty area as the parking space 120.

Therefore, according to the conventional parking control method, in order to detect a parking space 120 at an unknown location, the vehicle 100 needs to continuously search for the parking space 120 at the low speed that is suitable for accurate sensing of the ultrasonic sensor when the parking control is started. In addition, in order to search for the parking space 120, the vehicle 100 needs to detect other vehicles 110 and 115 positioned on the left and the right of the parking space 120, and to this end, a completion time of the parking space search is set to a point in time when detection of a vehicle 115 parked beside the parking space 120 is completed.

When the detection of the parking space 120 is completed, the vehicle 100 starts a parking operation according to a parking path at a parking operation start point when the vehicle 100 advancing to a certain point stops.

As described above, according to the conventional parking control method, the vehicle 100 which has entered a parking lot needs to travel at the low speed for a prolonged period of time in order to search for the parking space 120, and the detection time for the parking space 120 is also delayed to the point in time when the detection of the vehicle 115 parked beside the parking space 120 is completed. Consequently, a position at which the vehicle 100 stops and initiates the parking operation is significantly far from the parking space 120. In addition, as the time point of starting the parking operation is delayed, there is also a problem in that a gear shifting process for parking the vehicle 100 in the parking space 120 becomes complicated, as shown in FIG. 2.

Figure 2:
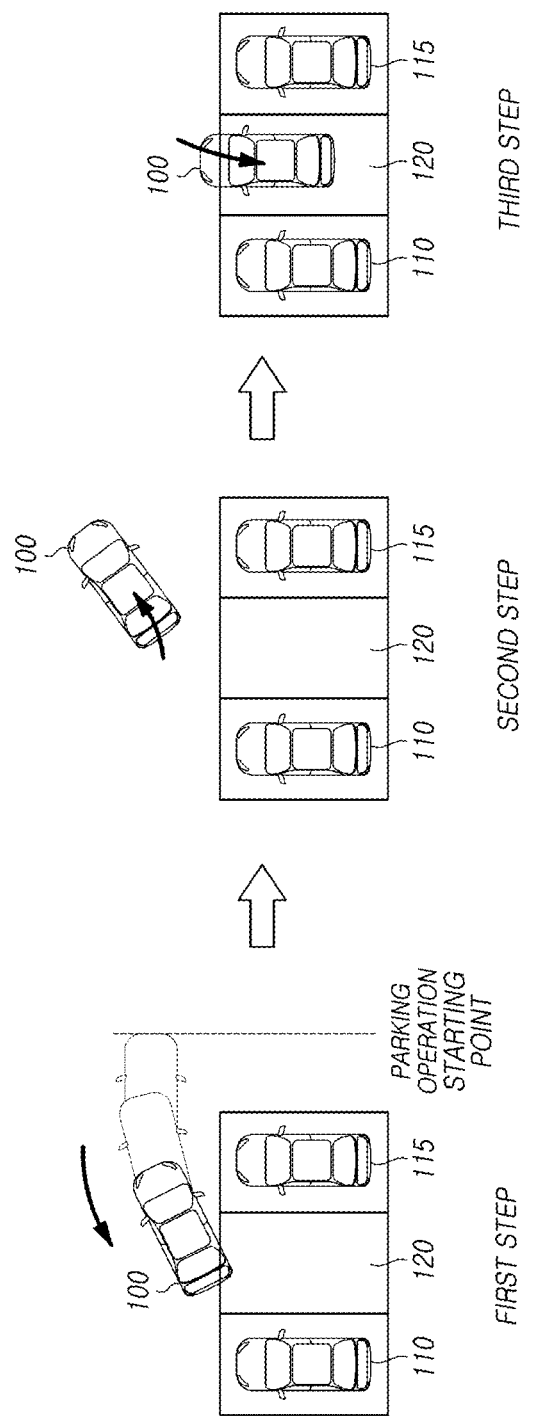
FIG. 2 is a diagram for describing a gear shifting process of a vehicle with conventional parking control.

FIG. 2 is a diagram for describing a gear shifting process of a vehicle for conventional parking control.

Referring to FIG. 2, as shown in a first step, when the vehicle 100 stops at the position of starting the parking operation, the vehicle 100 is moved backward in a direction of the parking space 120 by shifting a gear to a reverse gear. However, since a parking operation starting point at which the vehicle 100 stops is far apart from the parking space 120, the vehicle 100 cannot enter the parking space 120 at once. Thus, as shown in a second step, the vehicle 100 may move forward by a certain distance in a direction away from the parking space 120 by shifting the gear from the reverse gear to a drive gear. Then, as shown in a third step, the vehicle 100 may stop after moving forward by the certain distance and then enter the parking space 120 by re-shifting the gear from the drive gear to the reverse gear. This is because of other vehicles 110 and 115 located on the left and right of the parking space 120 and the position of the vehicle 100 at the time of starting the parking operation. The frequent shifting the gear of the vehicle 100 may lower the ability to rely on parking and inconvenience the driver.

As described with reference to FIGS. 1 and 2, the conventional parking control apparatus has a problem in that the ability to rely on for the user is lowered due to the low speed traveling for detecting a parking space and the frequent gear shifting process in the parking path, thereby decreasing usability.

The present disclosure devised to solve the problem reduces the time for detecting a parking space and prevents the frequent shifting of a gear in the parking path, thereby greatly improving the use of parking control function by a driver.

Hereinafter, an obstacle located around a parking space is illustratively described as another vehicle, but may be a variety of objects, such as an obstruction or a wall.

Figure 3:
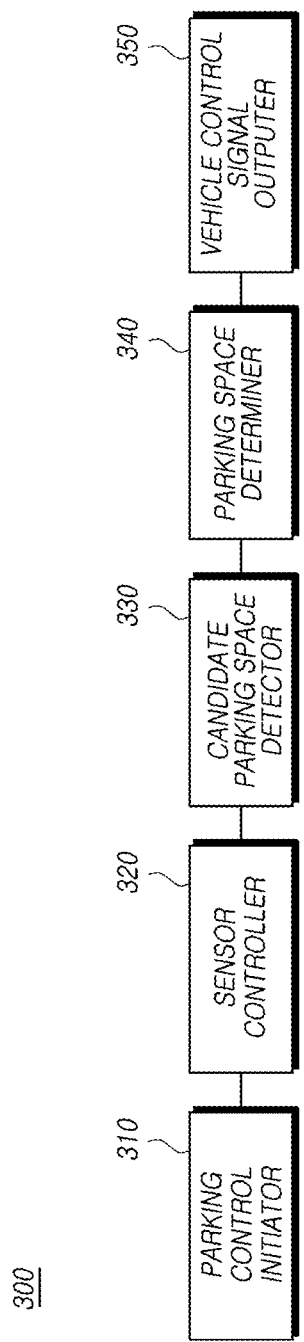
FIG. 3 is a diagram for describing a configuration of a parking control apparatus according to one embodiment.

FIG. 3 is a diagram for describing a configuration of a parking control apparatus according to one embodiment.

Referring to FIG. 3, the parking control apparatus 300 according to one embodiment may include a parking control initiator 310 which acquires an input signal for parking control and determines whether to start a parking control operation, a sensor controller 320 which sets a first sensor mounted in the vehicle in order to detect a candidate parking space when the parking control operation is started, a candidate parking space detector 330 which detects the candidate parking space using first sensing information acquired from the first sensor, a parking space determiner 340 which determines a parking space by computing at least one of the presence or absence of an obstacle in the candidate parking space and size information of the candidate parking space using second sensing information acquired from a second sensor, and a vehicle control signal outputter 350 which outputs at least one of a steering control signal, a vehicle speed control signal, and a gear shifting control signal for parking the vehicle in the parking space.

For example, when the parking control initiator 310 receives an input signal for parking control, the parking control initiator 310 may determine whether to start a parking control operation on the basis of the input signal. The input signal may be a variety of signals to initiate the parking control operation. In one example, the input signal may be a signal generated in response to a button input or a touch pad input of a driver in order to switch a parking control function to an ON state. In another example, the input signal may be a received signal generated inside or outside of the vehicle when the vehicle enters a specific position. That is, when the vehicle enters a parking lot, the input signal may be generated through position information of the vehicle or may be a received signal generated by an input signal generator installed in the parking lot. In addition, the input signal may be generated in various ways according to a motion of the driver or the position and state of the vehicle, but there is no limitation on the input signal in the present disclosure.

Moreover, the input signal for parking control may further include information about a direction in which the vehicle performs a search to park the vehicle. For example, in a case where parking bays are on the left and the right of the vehicle, which has entered the parking lot, the input signal may include information instructing a parking bay to be searched to determine a parking space. The information about the direction in which the vehicle performs the search to park the vehicle may be determined by a signal input by a driver.

Meanwhile, when the parking control operation is started, the sensor controller 320 may set the first sensor mounted in the vehicle for detecting a candidate parking space. For example, when the parking control operation is started, the sensor controller 320 may electronically or mechanically control the first sensor to change at least one of a detection angle or a detection range of the first sensor. An operation of the sensor controller 320 will be described in detail with reference to FIG. 4. As described above, the first sensor may be any sensor mounted in the vehicle, such as a radar sensor, a Lidar sensor, a camera sensor, an infrared sensor, or the like. Although FIG. 4 shows an example of a radar sensor, but the present embodiment may be applied with any sensor among the above-described various sensors.

Figure 4:
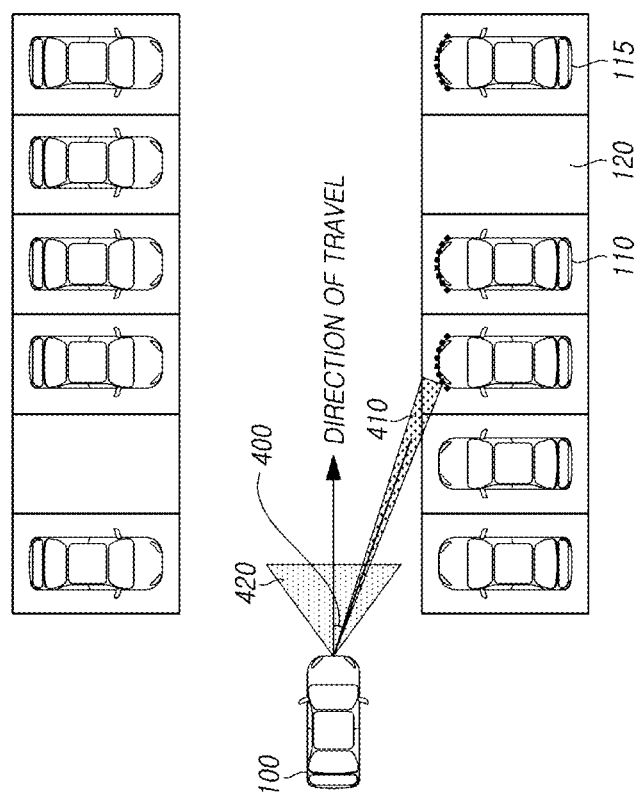
FIG. 4 is a diagram for describing an operation of controlling a radar sensor according to one embodiment.

FIG. 4 is a diagram for describing an operation of controlling a radar sensor according to one embodiment.

Referring to FIG. 4, a radar sensor may be mounted in the vehicle 100. The radar sensor may be mounted in the vehicle 100 so as to be utilized in various functions, such as a forward vehicle following function, a blind-spot detection function, an emergency crash-prevention function, and the like. In addition, the radar sensor may be variously mounted in the front, rear, and sides of the vehicle 100 to perform the above-described functions. FIG. 4 is a view based on a radar sensor mounted in the front of the vehicle 100, but the present embodiments may also be applied with a radar sensor configured on the lateral side of the vehicle.

When the parking control operation is started and the sensor controller 320 receives information about a search direction in which the vehicle 100 is to search, the sensor controller 320 may change the detection angle or a detection range of the radar sensor according to the search direction. For example, when a right-side direction of the vehicle 100 is set as a search direction, the sensor controller 320 may control the detection angle of the radar sensor to be turned in the search direction by a predetermined angle 400 with respect to a traveling direction. For example, in a case where the radar sensor mounted in the vehicle 100 is set to have a detection range and a detection angle shown in a shape 420, when the parking control operation is started, the detection angle may be set to be turned by a predetermined angle 400 shown in a shape 410 and the detection range may be changed to be narrower than the detection range before the start of the parking control operation. Thus, the vehicle 100 may sense other vehicles 110 and 115 located in front of the vehicle in advance through the radar sensor. In addition, the sensor controller 320 may maintain a long detection distance and minimize detection of unnecessary targets by narrowing the detection range.

In the present embodiments, the detection angle of the radar sensor may be mechanically changed or may be changed by a signal processing technology such as digital beamforming. In addition, the detection range may be variably set by changing the number of channels included in the radar sensor through a signal processing method.

Alternatively, since the radar sensor mounted in the vehicle 100 performs not only a function for parking control but also the above-described various functions, the sensor controller 320 may change a detection angle and a detection range for only some antennas of the radar sensor so as to retain part of the existing functions of the radar sensor. For example, the radar sensor may include a long-range detection antenna and a short-range detection antenna and may control only one of the long-range and short-range detection antennas to be changed in order to detect a candidate parking space when the parking control operation is started. That is, when the detection range of the short-range detection antenna is the shape 420 in FIG. 4, previous settings for the detection angle and the detection range shown in the shape 420 may be maintained intact so that a risk of sudden collision in front of the vehicle may be detected and the sensor controller 320 may control to form the detecting angle and the detection range shown in the shape 410 only using the long-range detection antenna. When the detection range shown in the shape 410 is set to be the same as the detection range for parking control, the sensor controller 320 may change the detection angle by a predetermined angle 400.

Accordingly, it may be possible to utilize the radar sensor for parking control while maintaining the existing risk detection function through the radar sensor. In addition, the radar sensor is capable of detecting a target even at a high speed, as compared to an ultrasonic sensor, and hence reduction of a vehicle speed in an operation for detecting a candidate parking space can be avoided.

Figure 5:
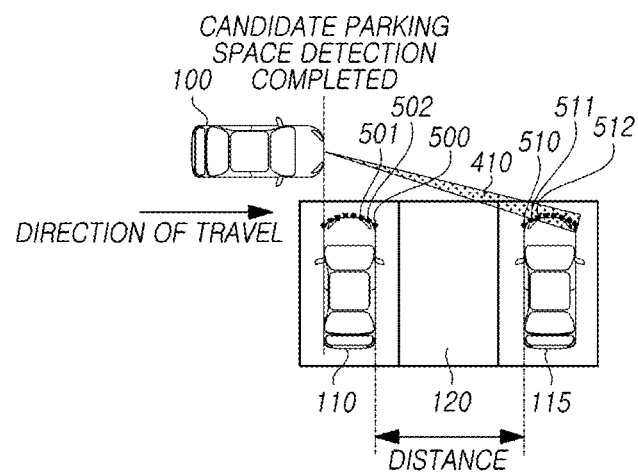
FIG. 5 is a diagram for describing an operation of detecting a candidate parking space according to one embodiment.

FIG. 5 is a diagram for describing an operation of detecting a candidate parking space according to one embodiment.

When the detection angle or the detection range of the first sensor is changed, the candidate parking space detector 330 may detect a candidate parking space using first sensing information obtained from the first sensor.

Referring to FIG. 5, the first sensing information may include edge information extracted from target information obtained from the first sensor. For example, the candidate parking space detector 330 may extract edge information of other vehicles 110 and 115 located in front of the vehicle 100. The edge information may be extracted from bumpers of the parked vehicles 110 and 115 and be extracted in the form of a point or a line.

Specifically, the candidate parking space detector 330 may extract pieces of edge information 500, 501 and 502 in the form of a point from the vehicle 110 on the left side of the parking space 120 and extract pieces of edge information 510, 511, and 512 in the form of a point from the vehicle 115 on the right side. In the case where the edge information in the form of a line is extracted, a shape of a bumper of each of the other vehicles 110 and 115 may be extracted in the form of a line. Hereinafter, the following description will be based on edge information in the form of a point, but the present embodiments may be applied with edge information in the form of a line.

The candidate parking space detector 330 may extract edge information included in the first sensing information to calculate a spacing distance between the plurality of objects 110 and 115 and detect the candidate parking space 120.

In one example, the candidate parking space detector 330 may calculate a spacing distance between the plurality of objects 110 and 115 using a spacing distance between the pieces of extracted edge information. For example, the candidate parking space detector 330 may calculate a spacing distance between pieces of edge information 501 and 502 and a spacing distance between pieces of edge information 502 and 500. In the same manner, the candidate parking space detector 330 may calculate a spacing distance between pieces of edge information 500 and 510, a spacing distance between pieces of edge information 510 and 511, and a spacing distance between pieces of edge information 511 and 512. When the spacing distance between the pieces of edge information 500 and 510 among the calculated distances is greater than or equal to a preset reference distance, the candidate parking space detector 330 may detect a space corresponding to the width of a candidate parking space 120. That is, when the spacing distance between the pieces of edge information 500 and 510 is greater than or equal to the reference distance, the candidate parking space detector 330 may detect the space corresponding to the distance of the candidate parking space 120.

In another example, the candidate parking space detector 330 may group the pieces of edge information on the basis of preset criterion. For example, the candidate parking space detector 330 may group pieces of edge information 500, 501, and 502 extracted from the vehicle 110 into one group, group pieces of edge information 510, 511, and 512 extracted from the vehicle 150 into another group, and calculate a spacing distance between the objects using a spacing distance between the edge groups. In still another example, when the edge information is extracted in the form of a line, the candidate parking space detector 330 may calculate a spacing distance between an end portion of one piece of edge information and a start portion of another piece of edge information as a spacing distance between the objects and thus detect the candidate parking space 120.

In addition, the reference distance for detecting the candidate parking space may be determined based on at least one of width information of the vehicle and mode input information from the driver.

In one example, the reference distance may be variably set in association with the width of the vehicle. Specifically, when the vehicle is wide in width, the reference distance is set to be wide and when the vehicle is narrow, the reference distance is set to be narrow. Alternatively, a certain width range is mapped to one reference distance, and the reference distance may be determined using such a mapping table.

In another example, the reference distance may be variably set by mode input information from the driver. That is, when the driver generates input information for selecting a first mode, a first reference distance predetermined in accordance with the first mode may be determined as the reference distance and be compared to the spacing distance between the objects. A predetermined number of modes may be set for each reference distance. Therefore, the driver may set a preferred area of a parking space in advance through the mode selection, so that the parking space may be determined according to the preference of each driver.

In still another example, the reference distance may be determined using both the width of the vehicle and the mode input information from the driver.

In yet another example, the reference distance may be dynamically set according to the number of passengers in the vehicle, a boarding direction of a passenger (whether the passengers have boarded the vehicle only in one direction, whether passengers are anticipated to get off in both directions, etc.). That is, the reference distance may be set differently between a case where only the driver is in the vehicle and a case where the driver and the passenger in a passenger seat are both present in the vehicle. For example, the reference distance when both the driver and the passenger are present in the vehicle may be set to be wider when compared to a case where only the driver is present. Detection of the number of passengers or the boarding direction may be performed by detection sensors on vehicle seats or a camera or the like for sensing the interior of the vehicle.

In yet another example, the reference distance may be differently set according to the presence or absence of a child in the vehicle. That is, the reference distance for a case where a child is present in the vehicle may be set to be wider in comparison with a case where a child is not present in the vehicle. The presence or absence of a child may be determined by a selection signal input from the driver or a sensor capable of monitoring the interior of the vehicle.

Through the above operations, the candidate parking space detector 330 detects the candidate parking space 120 through the first sensor in advance before the vehicle 100 approaches the candidate parking space 120 and provides the candidate parking space so as to enable quick performance of a parking control operation. That is, the candidate parking space detector 330 completes the detection of the candidate parking space before the vehicle 100 approaches the candidate parking space 120 so that the parking operation may be performed without reducing the speed of the vehicle.

Meanwhile, the parking control apparatus 300 may perform an operation for ultimately determining whether the candidate parking space is an available parking space for the vehicle, which will be described in detail with reference to FIG. 6.

Figure 6:
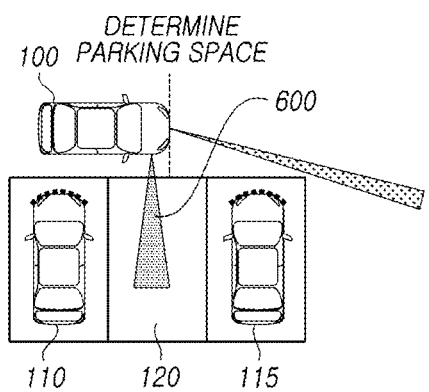
FIG. 6 is a diagram for describing an operation of determining a parking space according to one embodiment.

FIG. 6 is a diagram for describing an operation of determining a parking space according to one embodiment.

Referring to FIG. 6, when the candidate parking space 102 is detected, the parking space determiner 340 may determine a parking space by computing at least one of the presence or absence of an obstacle in the candidate parking space and size information of the candidate parking space using second sensing information acquired from the second sensor. To this end, the parking space determiner 340 may control the second sensor (e.g., an ultrasonic sensor) to sense a lateral side of the vehicle to initiate an operation when the vehicle 100 approaches within a predetermined distance to the candidate parking space 120. The second sensor is configured on the lateral side of the vehicle 100 and has a detection range 600 set to detect a distance between the lateral side of the vehicle and an object.

Therefore, at a position where the candidate parking space 120 is detected, the parking space determiner 340 may control the second sensor to be operated to prevent an operation of determining the parking space until the vehicle 100 approaches within a predetermined distance to the candidate parking space 120, acquire the second sensing information through the second sensor when the vehicle 100 approaches within the predetermined distance, and determine the candidate parking space 120 to be the final parking space using the second sensing information.

In one example, the parking space determiner 340 may use the second sensing information to determine whether an obstacle that has not been detected by the first sensor exists in the candidate parking space 120. Since the first sensor detects a target at a long distance, a detection blind spot may be generated by another vehicle 110. Therefore, when an obstacle of a predetermined size exists in the candidate parking space 120, the obstacle may not be detected by the first sensor. In this case, the parking space determiner 340 may determine whether an obstacle that has not been detected by a radar sensor exists in the candidate parking space 120 by using the second sensing information acquired by the second sensor. When the obstacle exists, the parking space determiner 340 may initialize the corresponding candidate parking space 120 and perform an operation for re-detecting a candidate parking space 120. On the other hand, when the obstacle does not exist, the parking space determiner 340 may determine the corresponding candidate parking space 120 to be a parking space.

In another example, the parking space determiner 340 may precisely measure a size of the candidate parking space 120 using the second sensing information. Since the second sensor, such as an ultrasonic sensor, may precisely measure a distance in a short distance, the parking space determiner 340 may calculate depth information, area information, and the like of the candidate parking space 120 using the second sensing information. Thus, the parking space determiner 340 may determine whether the size of the candidate parking space 120 is sufficient to park the vehicle and, when it is determined that the size is sufficient to park the vehicle, determine the corresponding candidate parking space 120 to be a parking space. When it is determined that the size of the candidate parking space 120 is not sufficient to park the vehicle, the parking space determiner 340 may initialize the corresponding candidate parking space 120 and re-perform an operation for detecting a candidate parking space 120.

In still another example, the parking space determiner 340 may determine the presence or absence of an obstacle and measure the size of the candidate parking space using the second sensing information, as described above, and ultimately determine whether the candidate parking space 120 is suitable as a parking space using the obtained determination and measurement results.

In yet another example, when the parking space determiner 340 receives an input selection signal from the driver for the candidate parking space, the parking space determiner 340 may determine the candidate parking space indicated by the selection signal to be the parking space. For example, a plurality of candidate parking spaces may be separately displayed through a display inside the vehicle. In this case, the driver may select a particular candidate parking space. The selection signal may be variously input through a touch input on the display or an input through a button in the vehicle and is not particularly limited. When the driver selects a particular candidate parking space, the selected candidate parking space may be determined as the parking space. In this case, the vehicle may set a parking path on the basis of the corresponding candidate parking space and initiate the parking operation.

As described above, the parking space determiner 340 may determine the parking space before the vehicle 100 passes through the candidate parking space 120 according to the detection range 600 of the ultrasonic sensor. For example, when whether an obstacle exists in the candidate parking space 120 is determined, since a spacing distance between other vehicles 110 and 115 is already known through the first sensing information of the first sensor, evaluation of the candidate parking space 120 may be completed before another vehicle 115 is detected by the second sensor.

Accordingly, it is possible to determine the parking space earlier than the conventional parking control system described with reference to FIGS. 1 and 2. The earlier the parking space is determined, the shorter the time for parking control is, and a gear shifting process is significantly reduced according to the change of a parking path, which will be described below. Hereinafter, additional operations according to the above-described operation, such as a method of searching for a parking space by changing a speed of a vehicle, and a method of reducing a gear shifting process by setting a parking path, will be described with reference to the accompanying drawings.

Figure 7:
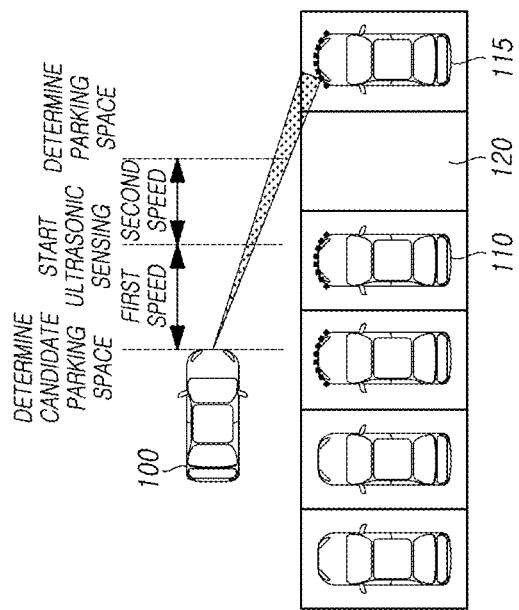
FIG. 7 is a diagram for describing an operation of controlling a speed of a vehicle in the parking control process according to one embodiment.

FIG. 7 is a diagram for describing an operation of controlling a speed of a vehicle in the parking control process according to one embodiment.

Referring to FIG. 7, when the candidate parking space detector 330 detects the candidate parking space 120, the vehicle control signal outputter 350 may control the speed of the vehicle 100 to be set as a first speed. Then, when the vehicle 100 approaches within a predetermined distance to the candidate parking space 120 at the first speed and reaches a point where the sensing using the second sensor starts, the vehicle control signal outputter 350 may control the speed of the vehicle 100 to be set as a second speed. In this case, the first speed may be set higher than the second speed. That is, the first speed may be set to be faster than the second speed. The vehicle 100 may be moved at the second speed until a parking space is determined.

For example, when the candidate parking space 120 is detected through the first sensor, the parking control apparatus 300 may move quickly to a point for sensing the candidate parking space 120 through the second sensor. However, since the vehicle 100 may need to additionally sense the candidate parking space as the vehicle 100 moves, the first speed may be limited to a maximum speed at which the first sensing information may be obtained through the first sensor. Accordingly, after the candidate parking space is determined, unnecessary low-speed travel of the vehicle is prevented until the second sensor is operated, thereby reducing the time required for the parking control operation. That is, this is a characteristic differentiated from the low-speed travel for sensing during the entire parking operation time of the conventional parking control system using only the second sensor, and thanks to this characteristic, it is possible to greatly reduce the time required for parking control operation.

In addition, in the case where the parking space is determined in response to the driver's selection signal, even when a candidate parking space exists in the path to the parking space, sensing of the candidate parking space using the second sensor may not be performed. That is, the vehicle may travel at the first speed to the determined parking space.

Alternatively, the sensing of the corresponding candidate parking space using the second sensor may be performed. This is because, since a selection signal from the driver may be generated before the information of the second sensor is utilized, an obstacle may exist in the selected parking space. That is, when it is finally determined that the parking space selected by the driver is not available for parking after sensing the candidate parking space is performed through the second sensor, a selection signal may be re-received by re-providing the driver with a candidate parking space in which parking is possible.

In addition, the first speed and the second speed may be preset or may be tuned by the driver. However, as described above, the first speed may be limited to the maximum speed at which the operation of the second sensor is possible, and the second speed may also be limited to the maximum speed at which the operation of the second sensor is possible. In addition, it is preferable that the first speed is set to be faster than the second speed.

When the parking control apparatus 300 determines the parking space through the above-described operations, it is required to set a parking path and control vehicle behavior to park the vehicle in the parking space.

Figure 8:
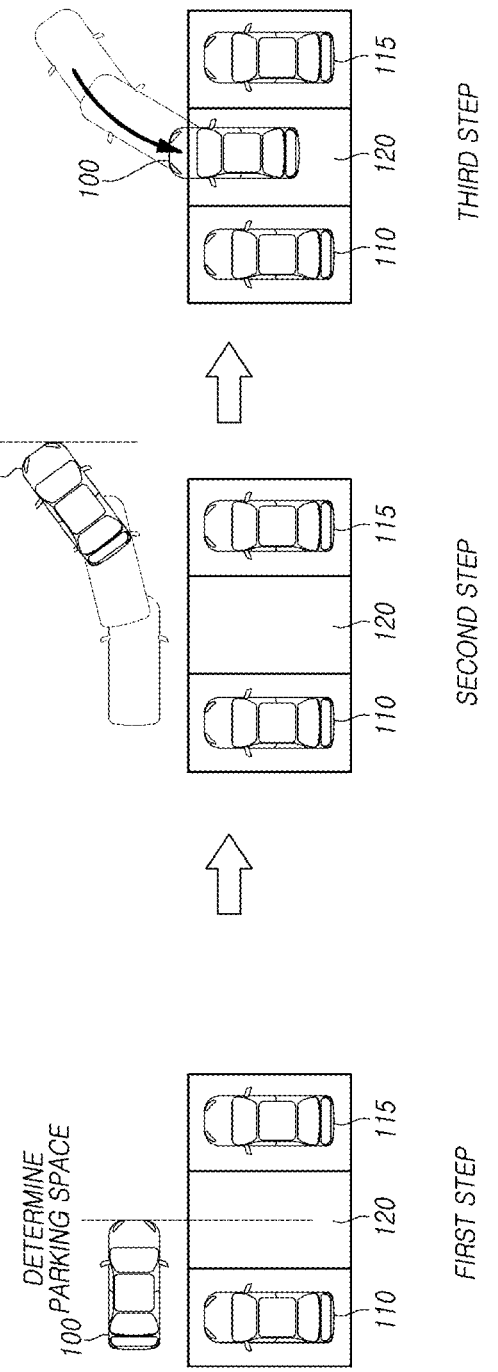
FIG. 8 is a diagram for describing a gear shifting process in the parking control operation according to one embodiment.

FIG. 8 is a diagram for describing a gear shifting process in the parking control operation according to one embodiment.

Referring to FIG. 8, the vehicle control signal outputter 350 may output at least one of a steering control signal, a vehicle speed control signal, and a gear shifting control signal for parking the vehicle 100 in the parking space 120. For example, when the parking space 120 is determined, the vehicle control signal outputter 350 may generate a parking path so that the vehicle 100 may be parked in the parking space 120 at the time of determining the parking space. In this case, the parking path may be set such that a travel angle of the vehicle 100 is changed at the time of determining the parking space 120.

As described above, the parking control apparatus 300 may determine the parking space 120 using the information acquired from the first sensor and the second sensor, and the point in time when the parking space 120 is determined may be one of a point in time when another vehicle 115 starts to be detected by the second sensor, a point in time when the determination of whether an obstacle exists in a candidate parking space is completed, and a point in time when the comparison between the size of the candidate parking space and a size available for parking is completed. Therefore, it is possible to complete the determination of the parking space 120 much earlier than the conventional parking space search which is described with reference to FIG. 1. That is, as shown in a first step, before the vehicle 100 moves away from the parking space 120, the determination of the parking space 120 may be completed. In this case, the vehicle control signal outputter 350 may set the parking path using the position of the vehicle at the time of determining the parking space, the location of the parking space 120, the positions of other vehicles 110 and 115, and the like.

In addition, the vehicle control signal outputter 350 sets the parking path before moving away from the parking space 120 so that the parking path which minimizes the gear shifting process of the vehicle 100 may be set. For example, the vehicle control signal outputter 350 may set the parking path such the travel angle of the vehicle 100 is changed and the vehicle 100 moves forward at the time of determining the parking space. That is, as shown in a second step, the vehicle 100 may move forward by a predetermined distance after the time point of determination of the parking space, wherein the travel angle of the vehicle 100 may be moved away from the parking space 120. Thereafter, shifting a gear to a reverse gear may be performed after the vehicle 100 stops.

Then, as shown in a third step, the vehicle control signal outputter 350 may control the vehicle 100 to move backward in a direction of the parking space 120 after stopping.

When the parking operation according to the parking path of FIG. 8 is compared to the parking operation according to the conventional parking path of FIG. 2, as the parking space determination time becomes earlier than the conventional parking operation, two instances of shifting the gear from forward to reverse in FIG. 2 is reduced to one instance and shifting the gear from reverse to forward is not required, so that the time required for parking is greatly reduced according to the present embodiment. That is, in comparison with FIG. 2, the present embodiment may omit the first step shown in FIG. 2.

As described with reference to FIGS. 1 to 8, the present embodiments additionally utilize the first sensor information in the parking control operation for the vehicle, thereby reducing unnecessary time and improving the driver's ability to relay on the parking control system.

Hereinafter, a parking control method capable of performing the above-described operations will be described with reference to the accompanying drawings.

Figure 9:
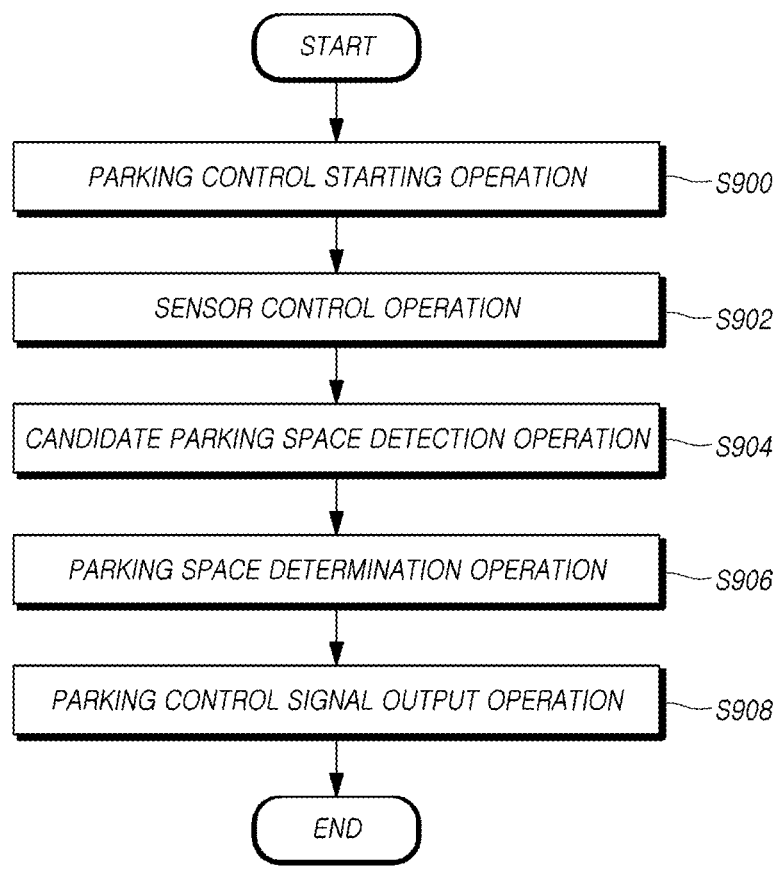
FIG. 9 is a diagram for describing operations of a parking control method according to one embodiment.

FIG. 9 is a diagram for describing operations of a parking control method according to one embodiment.

Referring to FIG. 9, the parking control method may include a parking control starting operation of obtaining an input signal for parking control and determining whether to start a parking control operation (S900). In the parking control starting operation, an input signal generated inside or outside of a vehicle and whether to start the parking control operation is determined. The input signal may include information indicating a search direction, and, when the input signal includes the information indicating the search direction, the start of the parking control operation may be controlled in consideration of the search direction.

In addition, when the parking control operation is started, the parking control method may include a sensor control operation of setting a first sensor mounted in the vehicle for detecting a candidate parking space (S902). In the sensor control operation, when the parking control operation is started, a detection angle or a detection range of the first sensor may be changed in consideration of the search direction. In addition, in the sensor control operation, the detection angle and the detection range may be changed for only one of antennas included in the first sensor in consideration of existing functions of the first sensor. The detection angle may be changed to be turned in the search direction by a predetermined angle and the detection range may be changed to narrow a radar beam for precise detection in a long range.

In addition, the parking control method may include a candidate parking space detection operation of detecting a candidate parking space using first sensing information acquired from the first sensor (S904). In the candidate parking space detection operation, edge information of an object may be extracted from the first sensing information received from the first sensor having a changed detection angle or detection range and a spacing distance between the objects may be calculated using the extracted edge information. In the candidate parking space detection operation, when the spacing distance between the objects is greater than or equal to a preset reference distance, the corresponding candidate space may be detected as the candidate parking space. For example, in the candidate parking space detection operation, the edge information in the form of a point or in the form of a line may be extracted and the candidate parking space may be detected using a spacing distance between the pieces of edge information. A plurality of pieces of edge information may be grouped into edge groups as needed and the candidate parking space may be detected using a spacing distance between the edge groups. In addition, the reference distance may be variably set according to various methods.

Moreover, the parking control method may include a parking space determination operation of determining a parking space by computing at least one of the presence or absence of an obstacle in the candidate parking space and size information of the candidate parking space using second sensing information acquired from a second sensor (S906). In the parking space determination operation, when the candidate parking space is detected, the operation of the second sensor may be controlled and the candidate parking space may be determined as the parking space using the second sensing information acquired from the second sensor. For example, when the vehicle approaches the candidate parking space at a predetermined distance, the second sensor may be controlled to start operating and the parking space may be determined by checking whether an obstacle exists in the candidate parking space or whether the size of the candidate parking space is sufficient to park the vehicle through the second sensor.

The parking control method may include a parking control signal output operation of outputting at least one of a steering control signal, a speed control signal, and a gear shifting control signal (S908). In the vehicle control signal output operation, when the candidate parking space is detected, the speed of the vehicle is set to a first speed until the second sensor of the vehicle starts operating, and once the second sensor operates, the speed of the vehicle may be set to a second speed. In this case, the first speed may be set to be higher than the second speed. Thus, it is possible to prevent unnecessary low-speed travel of the vehicle. In addition, in the vehicle control signal output operation, when the parking space is determined, a parking path is set and a control signal for speed, steering, or gear shifting may be output to enable the vehicle to move along the parking path. In this case, the determination of the parking space is completed before the vehicle moves away from the parking space and once the parking space is determined, the vehicle may be controlled to move forward by changing the travel angle of the vehicle in a direction in which the vehicle moves away from the parking space. Then, the vehicle may be parked in the parking space through one-time reverse-movement control.

Each of the operations according to the present embodiments is described in brief. Hereinafter, a whole operation flow in consideration of a change of a vehicle speed and a case where a candidate parking space is not determined as a parking space will be briefly described.

FIG. 10 is a diagram for describing an operation of a parking control method, including vehicle speed control, according to one embodiment in detail.

Referring to FIG. 10, in the parking control method, an input signal including a search direction is received and a detection angle or a detection range of a first sensor may be changed according to the search direction (S1000). Then, an object existing in the search direction is searched through the changed first sensor to detect a candidate parking space (S1010). The candidate parking space may be detected using a spacing distance between pieces of edge information extracted according to the object. When the candidate parking space is not detected, a candidate parking space is detected by continuously sensing an object in a traveling direction of the vehicle. Once the candidate parking space is detected, a speed of the vehicle is changed to a preset first speed (S1020).

In the parking control method, it is monitored whether the vehicle enters within a predetermined distance to the candidate parking space while the vehicle is traveling (S1030). When the vehicle enters within the predetermined distance to the candidate parking space, the speed of the vehicle is changed to a preset second speed and the second sensor is controlled to operate (S1040). For example, the parking control method may control to operate only the second sensor which detects the search direction.

Then, in the parking control method, the parking space is determined by determining whether the candidate parking space is suitable for parking the vehicle using second sensing information acquired from the second sensor (S1050). When an obstacle detected by the second sensor exists in the candidate parking space or the size of the candidate parking space is less than a size sufficient for parking the vehicle, the candidate parking space is not selected and a candidate parking space search is reset along the direction of travel of the vehicle.

Therefore, when the parking space is determined, the parking control method may set a parking path of the vehicle and control the vehicle to be parked in the parking space.

According to the present disclosure described above, by additionally using the information of the first sensor, it is possible to reduce time for detecting the parking space and reduce the gear shifting process in the parking path, thereby improving the driver's ability to rely on the parking control system.

According to the above-described embodiments, the control time and gear shifting process for controlling parking of a vehicle are reduced, thereby improving the driver's stability and ability to rely on the parking control apparatus.

The above embodiments of the present disclosure have been described only for illustrative purposes, and those skilled in the art will appreciate that various modifications and changes may be made thereto without departing from the scope and spirit of the disclosure. Therefore, the embodiments of the present disclosure are not intended to limit, but are intended to illustrate the technical idea of the present disclosure, and the scope of the technical idea of the present disclosure is not to be limited by the embodiments. The scope of the present disclosure shall be construed on the basis of the accompanying claims in such a manner that all of the technical ideas included within the scope equivalent to the claims belong to the present disclosure.

What is claimed is:

1. A parking control apparatus comprising:
a parking control initiator configured to acquire an input signal for parking control and determines whether to start a parking control operation;
a sensor controller configured to, among first and second sensors mounted in a vehicle, control the first sensor to detect a candidate parking space when the parking control operation is started;
a candidate parking space detector configured to detect the candidate parking space using first sensing information acquired from the first sensor;
a parking space determiner configured to determine a parking space by computing presence or absence of an obstacle in the candidate parking space and size information of the candidate parking space using second sensing information acquired from the second sensor; and
a vehicle control signal outputter configured to output a speed control signal for parking the vehicle in the parking space, wherein the vehicle control signal outputter is configured to:
when the vehicle is positioned out of a predetermined distance range to the candidate parking space detected by the first sensor, control the vehicle by using the first sensor and control a speed of the vehicle to be set to a first speed higher than a second speed after the candidate parking space is detected by the first sensor and before the second sensor starts to operate, and
when the vehicle is positioned within the predetermined distance range to the candidate parking space detected by the first sensor, control the vehicle by using the second senor and change the speed of the vehicle to the second speed lower than the first speed after the second sensor starts to operate.

2. The parking control apparatus of claim 1, wherein, when the parking control operation is started, the sensor controller sets a detection angle or a detection range of the first sensor to be adjusted in a direction of the candidate parking space.

3. The parking control apparatus of claim 2, wherein:
the input signal for parking control further includes information about a search direction in which the vehicle performs a search;
the detection angle or the detection range of the first sensor is changed according to the search direction;
the detection angle is set to be turned in the search direction by a predetermined angle with respect to a direction of travel of the vehicle; and
the detection range is changed to be narrower than the detection range before input of the input signal.

4. The parking control apparatus of claim 1, wherein:
the first sensor includes a long-range detection antenna and a short-range detection antenna; and
the sensor controller controls one of the long-range detection antenna and the short-range detection antenna to be changed for detection of the candidate parking space.

5. The parking control apparatus of claim 1, wherein the candidate parking space detector detects positions of a plurality of objects by extracting edge information included in the first sensing information and calculates a spacing distance between the objects to detect the candidate parking space.

6. The parking control apparatus of claim 5, wherein the candidate parking space detector groups the extracted pieces of edge information into one or more edge groups according to a preset criterion and calculates the spacing distance between the objects using a spacing distance between the edge groups.

7. The parking control apparatus of claim 5, wherein, when the spacing distance between the objects is greater than or equal to a reference distance, the candidate parking space detector detects a space between the objects as the candidate parking space wherein the reference distance is determined based on at least one of width information of the vehicle, passenger information, and mode input information of a driver.

8. The parking control apparatus of claim 1, wherein, when the vehicle enters within a predetermined distance to the candidate parking space, the candidate parking space determiner controls the second sensor, which detects a lateral side of the vehicle, to start operating.

9. The parking control apparatus of claim 1, wherein, when it is determined that an object does not exist in the candidate parking space or a size of the candidate parking space is sufficient to park the vehicle, the parking space determiner determines the candidate parking space to be the parking space.

10. The parking control apparatus of claim 1, wherein, when a driver selection signal for the candidate parking space is input, the parking space determiner determines a candidate parking space indicated by the driver selection signal to be the parking space.

11. The parking control apparatus of claim 1, wherein the vehicle control signal outputter controls the speed of the vehicle to be set to the first speed when the candidate parking space is detected, and when the vehicle enters within the predetermined distance to the candidate parking space, the vehicle control signal outputter outputs the speed control signal to control the speed of the vehicle to be set to the second speed wherein the first speed is set to higher than the second speed.

12. The parking control apparatus of claim 1, wherein, when the parking space is determined, the vehicle control signal outputter generates a parking path along which the vehicle is parkable in the parking space at a point in time when the parking space is determined and the parking path is set such that a driving angle of the vehicle is changed at the point in time when the parking space is determined.

13. A parking control method comprising:
acquiring an input signal for parking control and determining whether to start a parking control operation;
controlling, among first and second sensors mounted in a vehicle, the first sensor for detecting a candidate parking space when the parking control operation is started;
determining a parking space by computing at least one of presence or absence of an obstacle in the candidate parking space and size information of the candidate parking space using second sensing information acquired from the second sensor;
when the vehicle is positioned out of a predetermined distance range to the candidate parking space detected by the first sensor, controlling the vehicle by using the first sensor and controlling a speed of the vehicle to be set to a first speed higher than a second speed after the candidate parking space is detected by the first sensor and before the second sensor starts to operate; and when the vehicle is positioned within the predetermined distance range to the candidate parking space detected by the first sensor, controlling the vehicle by using the second senor and changing the speed of the vehicle to the second speed lower than the first speed after the second sensor starts to operate.

14. The parking control method of claim 13, wherein the controlling of the first sensor includes setting a detection angle or a detection range of the first sensor to be adjusted in a direction of the candidate parking space when the parking control operation is started.

15. The parking control method of claim 13, wherein the controlling of the first sensor includes detecting positions of a plurality of objects by extracting edge information included in the first sensing information, calculating a spacing distance between the objects, and, when the spacing distance between the objects is greater than or equal to a reference distance determined based on at least one of width information of the vehicle, passenger information, and mode input information of a driver, detecting a space between the objects to be the candidate parking space.

16. The parking control method of claim 13, wherein the determining of the parking space includes controlling the second sensor, which detects a lateral side of the vehicle, to start operating when the vehicle enters within a predetermined distance to the candidate parking space.

17. The parking control apparatus of claim 1, wherein the vehicle control signal outputter outputs at least one of a steering control signal, and a gear shifting control signal for parking the vehicle in the parking space.

18. The parking control method of claim 13, further comprising outputting at least one of a steering control signal, and a gear shifting control signal for parking the vehicle in the parking space.

* * * * *